2,919,285
PREPARATION OF 5α-PREGNANE-3,20-DIONE FROM FUNTUMINE

Raphael Pappo, Skokie, Ill., assignor to G. D. Searle & Co., Chicago, Ill., a corporation of Delaware No Drawing. Application November 3, 1958
Serial No. 771,226

3 Claims. (Cl. 260—397.3)

The present invention relates to a novel process for the preparation of 5α-pregnane-3,20-dione from funtumine using osmium tetroxide as an oxidizing agent. Funtumine chemically is 3α-amino-5α-pregnane-20-one and can be isolated economically from the leaves of *Funtumia latifolia* Stapf and related species (cf. Janot et al., Comptes r. acad. 1958: 3076 and Quevauviller et al., Journal de Physiologie, 50: 469; 1958).

If funtumine is reacted with conventional basic reagents there is a considerable loss of yield because isomerization occurs in the 17-position. Along with the loss of yield additional problems are caused by the difficulty in isolating the 17β from the undesired 17α isomer. Hypochlorous acid produces other undesirable side reactions.

It has now been found that such isomerization can be avoided and that 5α-pregnane-3,20-dione can be obtained in excellent yield by use of osmium tetroxide as an oxidizing agent. The reaction presumably proceeds in two steps. On treatment of funtumine with 1 equivalent of osmium tetroxide there is apparently formed the osmate complex of 3-imino-5α-pregnane-20-one. This oxidation step can be carried out in such inert organic solvents as the lower aryl hydrocarbons (e.g. benzene, toluene, xylene), the lower alkanones (e.g. acetone, butanone and pentanone) and ethers (e.g. diethyl ether or dioxane). The 3-imino compound can then be hydrolyzed by treatment with base or with a reducing agent. Caution must be used also in this step in the employment of bases because these cause some inversion at carbon-17 as mentioned above. Reagents such as alkali metal sulfites carry out the hydrolysis without inversion at carbon-17.

Recognizing the relatively high price of osmium tetroxide, applicant has further improved the process so as to permit the use of catalytic quantities of this reagent. According to the improved process funtumine is contacted with only a catalytic amount of osmium tetroxide in the presence of a reconverting agent, i.e. a reagent capable of converting hexavalent osmium to octavalent osmium. Suitable for these purposes are the alkali metal halites (especially sodium chlorite and sodium bromite), the chlorates and periodates.

In this process in which only catalytic amounts of osmium tetroxide are used the reconverting agents can also perform the function of hydrolyzing the imino derivative to the ketone so that the successive steps of oxidation and hydrolysis are carried out as a single operation. Particularly useful solvents for this operation are the lower alkanols, and particularly tertiary butanol and tertiary pentanol.

The catalytic reaction and hydrolysis proceeds well at room temperature and below and can be completed conveniently in the course of 1 to 3 hours. The 5α-pregnane-3,20-dione is readily obtained in a relatively high degree of purity by a simple extraction procedure from the reaction mixture. No chromatographic separation is necessary to remove isomerization products, chloro derivatives and especially 17-iso derivatives.

5α-pregnane-3,20-dione is used commercially as a starting material for the preparation of more complex steroids, e.g. of such hormonal products as testosterone. The new process makes available their preparation from funtumine at commercially competitive prices.

The following examples will illustrate the invention in further detail, but the invention is not to be construed as limited thereby in spirit or in scope. Example 1 illustrates the use of osmium tetroxide in catalytic amounts, and Example 2 the process using an equivalent amount of osmium tetroxide. In these examples quantities are indicated in parts by weight.

Example 1

A solution of 0.9 part of funtumine in 16 parts of tertiary butanol is stirred with a solution of 0.165 part of sodium chlorite and 5 parts of water. The homogeneous solution is then cooled and treated with a solution of 0.026 part of osmium tetroxide and 1 part of tertiary butanol. After stirring for 2 hours at 5-20° C. the reaction mixture is extracted with a mixture of benzene and ether. The extract is washed successively with aqueous sulfuric acid, 30% aqueous sodium hydroxide containing 0.1% sodium chlorite, and water and then dried. The solvents are removed under nitrogen on a steam bath and the residue is crystallized from methanol to yield 5α-pregnane-3,20-dione in prisms melting at about 204-207° C.

Example 2

A solution of 1.5 parts of funtumine in 24 parts of benzene is stirred for 10 hours at room temperature with 1.62 parts of osmium tetroxide. The resulting suspension of dark, fine crystals is diluted with 25 parts of methanol and stirred for 10 hours with a solution of 3 parts of sodium sulfite and 20 parts of water. The mixture is then filtered and the filtrate is concentrated to a small volume, diluted with water and extracted with a mixture of benzene and ether. The organic phase is washed with aqueous sulfuric acid, water, aqueous sodium hydroxide, again with water, and dried. After evaporation of the solvent a crystalline solid is obtained which, on trituration with ether, yields crystals of 5α-pregnane-3,20-dione, melting at about 201-207° C.

What is claimed is:

1. In the process for the preparation of 5α-pregnane-3,20-dione, the step which consists of mixing 3α-amino-5α-pregnan-20-one with osmium tetroxide.

2. In the process for the preparation of 5α-pregnane-3,20-dione the step which consists of mixing 3α-amino-5α-pregnan-20-one with a catalytic amount of osmium tetroxide and a reagent capable of converting hexavalent osmium to octavalent osmium which is a member of the class consisting of alkali metal halites, chlorates and periodates.

3. The process for the preparation of 5α-pregnane-3,20-dione which comprises mixing 3α-amino-5α-pregnan-20-one with osmium tetroxide and sodium chlorite.

References Cited in the file of this patent

UNITED STATES PATENTS

| | | |
|---|---|---|
| 2,773,072 | Herr et al. | Dec. 4, 1956 |
| 2,781,342 | Herr et al. | Feb. 12, 1957 |
| 2,781,343 | Magerlein et al. | Feb. 12, 1957 |